United States Patent
Nakada

(10) Patent No.: US 9,792,677 B2
(45) Date of Patent: Oct. 17, 2017

(54) ELECTRONIC CAMERA, IMAGE PROCESSING DEVICE, AND IMAGE PROCESSING PROGRAM

(75) Inventor: Yuko Nakada, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 111 days.

(21) Appl. No.: 14/238,659

(22) PCT Filed: Aug. 31, 2012

(86) PCT No.: PCT/JP2012/005543
§ 371 (c)(1),
(2), (4) Date: May 13, 2014

(87) PCT Pub. No.: WO2013/031241
PCT Pub. Date: Mar. 7, 2013

(65) Prior Publication Data
US 2014/0240537 A1   Aug. 28, 2014

(30) Foreign Application Priority Data
Sep. 2, 2011   (JP) .................................. 2011-191542

(51) Int. Cl.
*G06T 7/00* (2006.01)
*H04N 1/00* (2006.01)
(Continued)

(52) U.S. Cl.
CPC ....... *G06T 7/0002* (2013.01); *H04N 1/00005* (2013.01); *H04N 1/00336* (2013.01);
(Continued)

(58) Field of Classification Search
CPC .............. G06T 7/0002; H04N 1/00005; H04N 1/00336; H04N 1/215; H04N 5/76;
(Continued)

(56) References Cited

U.S. PATENT DOCUMENTS

2011/0273471 A1   11/2011   Nagasaka et al.

FOREIGN PATENT DOCUMENTS

| JP | A-2001-285689 | 10/2001 |
|---|---|---|
| JP | A-2004-46591 | 2/2004 |

(Continued)

OTHER PUBLICATIONS

International Search Report issued in International Application No. PCT/JP2012/005543 on Dec. 4, 2012 (with translation).
(Continued)

*Primary Examiner* — Twyler Haskins
*Assistant Examiner* — Angel L Garces-Rivera
(74) *Attorney, Agent, or Firm* — Oliff PLC

(57) ABSTRACT

There are provided an imaging section imaging a subject and generating a plurality of images; an evaluating section performing evaluation on the plurality of images generated by the imaging section; a selecting section selecting, based on an evaluation result of the evaluating section, a part of images from among the plurality of images generated by the imaging section; a recognizing section performing scene recognition on a plurality of images selected by the selecting section; and a determining section determining, based on a recognition result of the recognizing section, reproduction order of the plurality of images subjected to the scene recognition.

8 Claims, 2 Drawing Sheets

(51) Int. Cl.
  *H04N 1/21*    (2006.01)
  *H04N 5/232*   (2006.01)
  *H04N 5/76*    (2006.01)
  *H04N 5/77*    (2006.01)
  *H04N 5/783*   (2006.01)
  *H04N 101/00*  (2006.01)

(52) U.S. Cl.
  CPC ......... *H04N 1/215* (2013.01); *H04N 5/23222* (2013.01); *H04N 5/76* (2013.01); *H04N 5/772* (2013.01); *H04N 1/00068* (2013.01); *H04N 5/783* (2013.01); *H04N 2101/00* (2013.01); *H04N 2201/0084* (2013.01); *H04N 2201/218* (2013.01)

(58) Field of Classification Search
  CPC ............... H04N 5/23222; H04N 5/772; H04N 1/00068; H04N 2201/0084; H04N 2201/218; H04N 2101/00; H04N 5/783
  See application file for complete search history.

(56) References Cited

FOREIGN PATENT DOCUMENTS

| | | |
|---|---|---|
| JP | A-2006-50494 | 2/2006 |
| JP | A-2008-263425 | 10/2008 |
| JP | A-2009-272740 | 11/2009 |
| JP | A-2010-166519 | 7/2010 |
| JP | A-2010-178318 | 8/2010 |

OTHER PUBLICATIONS

International Preliminary Report on Patentability issued in International Application No. PCT/JP2012/005543 on Dec. 4, 2012 (with translation).

May 12, 2015 Office Action issued in Japanese Patent Application No. 2011-191542.

Aug. 25, 2015 Office Action issued in Japanese Patent Application No. 2011-191542.

Sep. 30, 2016 Office Action issued in Chinese Application No. 201280042306.2.

ELECTRONIC CAMERA, IMAGE PROCESSING DEVICE, AND IMAGE PROCESSING PROGRAM

CROSS-REFERENCE TO RELATED APPLICATION

This application is a U.S. National Stage application claiming the benefit of prior filed International Application No. PCT/JP2012/005543, filed Aug. 31, 2012, in which the International Application claims a priority date of Sep. 2, 2011 based on prior filed Japanese Application Number 2011-191542, the entire contents of which are incorporated herein by reference.

TECHNICAL FIELD

The present application relates to an electronic camera, an image processing device, and an image processing program.

BACKGROUND ART

A technique in which a plurality of images are generated and recorded in a recording medium, the images are then evaluated based on a point of view of exposure, contrast, blur, and the like, and an image whose evaluation is lower than a predetermined criterion is deleted from the above-described recording medium, has been known in the prior art (refer to Patent Document 1, for example).

In the invention of Patent Document 1, image evaluation processing is carried out based on an evaluation of exposing condition, an evaluation of contrast, an evaluation of blur and defocusing, and the like. Further, to images remained without being deleted from the recording medium as a result of the image evaluation, names of serial numbers are normally given in chronological order.

Patent Document 1: Japanese Unexamined Patent Application Publication No. 2006-50494

DISCLOSURE

Problems to be Solved

Incidentally, the images remained without being deleted from the recording medium as a result of the above-described image evaluation are normally a plurality of pieces of images, and a user sequentially reproduces these images, and selects the most preferable one piece (or several pieces) of image(s). Since the names of serial numbers are given, in chronological order, to the images remained without being deleted from the recording medium, when these images are reproduced, the plurality of images are reproduced in chronological order.

However, in a group photograph, a ceremonial photograph or the like in which a main subject is a subject with no large motion, there is no particular advantage of reproducing in chronological order. Accordingly, the user has to perform comparison by sequentially making the plurality of images move forward or backward, and thus he/she cannot instantly judge that which image is the most preferable image, which is a problem.

The present application is made in view of the above-described problems, and a proposition thereof is to set reproduction order of a plurality of images to an optimum reproduction order in accordance with a characteristic of a subject.

Means for Solving the Problems

An electronic camera of the present embodiment includes an imaging section imaging a subject and generating a plurality of images; an evaluating section performing evaluation on the plurality of images generated by the imaging section; a selecting section selecting, based on an evaluation result of the evaluating section, a part of images from among the plurality of images generated by the imaging section; a recognizing section performing scene recognition on a plurality of images selected by the selecting section; and a determining section determining, based on a recognition result of the recognizing section, reproduction order of the plurality of images subjected to the scene recognition.

Note that it is also possible to further provide a naming section determining a name for each of the plurality of images subjected to the scene recognition in accordance with the reproduction order determined by the determining section.

Further, it is also possible that the determining section determines, based on the recognition result of the recognizing section, the reproduction order to be descending order of the evaluation performed by the evaluating section or order of imaging performed by the imaging section.

Further, it is also possible that the determining section determines, as the recognition result of the recognizing section, the reproduction order to be the order of imaging performed by the imaging section when a scene in which there is a continuous change in a main subject and determines the reproduction order to be the descending order of the evaluation performed by the evaluating section when there is no continuous change in the main subject.

Further, it is also possible that the evaluating section further evaluates whether or not a background region stands out when the recognition result of the recognizing section is a scene of portrait, and the determining section determines the reproduction order to be ascending order of standing-out degree of the background region as the evaluation result of the evaluating section when the recognition result of the recognizing section is the scene of portrait.

Further, it is also possible to further provide a recording section recording the plurality of images generated by the imaging section in a recording medium; and a deleting section deleting a part of images selected by the selecting section from among the plurality of images recorded in the recording medium based on the evaluation result of the evaluating section, in which the recognizing section may also perform the scene recognition on a plurality of images remained without being deleted by the deleting section.

Further, it is also possible that the recording section records information indicating the reproduction order determined by the determining section by associating the information with the plurality of images remained without being deleted by the deleting section.

An image processing device of the present embodiment includes an obtaining section obtaining a plurality of images as images to be processed; an evaluating section performing evaluation on the plurality of images obtained by the obtaining section; a recognizing section performing scene recognition on the plurality of images obtained by the obtaining section; and a determining section determining, based on a recognition result of the recognizing section, reproduction order of the plurality of images subjected to the scene recognition.

Note that it is also possible to further provide a recording section recording the plurality of images obtained by the obtaining section in a recording medium; and a deleting section deleting a part of images from among the plurality of images recorded in the recording medium based on an evaluation result of the evaluating section, and it is also possible that the obtaining section obtains a plurality of imaged and generated images as the plurality of images, and the recognizing section performs the scene recognition on a plurality of images remained without being deleted by the deleting section.

An image processing program of the present embodiment is an image processing program causing a computer to realize image processing on images to be processed, the image processing program including an obtaining step of obtaining a plurality of images as the images to be processed; an evaluating step of performing evaluation on the plurality of images obtained in the obtaining step; a recognizing step of performing scene recognition on the plurality of images obtained in the obtaining step; and a determining step of determining, based on a recognition result in the recognizing step, reproduction order of the plurality of images subjected to the scene recognition.

Effects

According to the present application, it is possible to set reproduction order of a plurality of images to an optimum reproduction order in accordance with a characteristic of a subject.

DETAILED DESCRIPTION OF THE EMBODIMENTS

Figure 1:
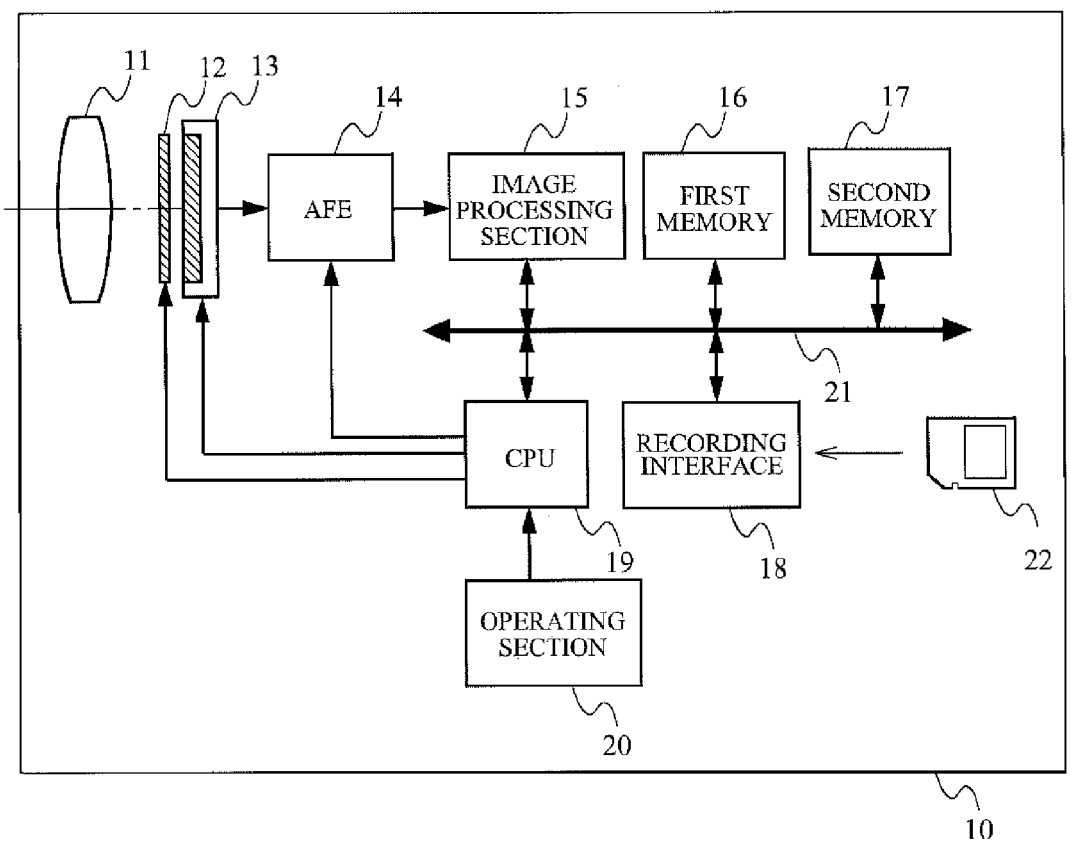
FIG. 1 is a block diagram illustrating a configuration example of an electronic camera according to one embodiment.

FIG. 1 is a block diagram illustrating a configuration example of an electronic camera 10 in one embodiment. The electronic camera 10 includes an imaging lens 11, a shutter 12, an imaging element 13, an AFE 14, an image processing section 15, a first memory 16, a second memory 17, a recording interface 18, a CPU 19, an operating section 20, and a bus 21. Here, the image processing section 15, the first memory 16, the second memory 17, the recording interface 18, and the CPU 19 are connected to one another via the bus 21. Further, the shutter 11, the imaging element 13, the AFE 14, and the operating section 20 are respectively connected to the CPU 19.

The shutter 12 is a mechanical shutter disposed between the imaging lens 11 and the imaging element 13.

The imaging element 13 is an imaging device that images an image formed by the imaging lens 11. The imaging element 13 of the one embodiment is formed of, for example, a CMOS-type solid-state imaging element capable of reading an image signal of an arbitrary light-receiving element in a random-access manner. Note that an output of the imaging element 13 is connected to the AFE 14.

The AFE 14 is an analog front-end circuit which performs analog signal processing on the output of the imaging element 13. The AFE 14 performs correlated double sampling, gain adjustment of an image signal, and A/D conversion of an image signal. Further, an output of the AFE 14 is connected to the image processing section 15. Note that the CPU 19 adjusts an imaging sensitivity corresponding to an ISO sensitivity by adjusting the gain of image signal with the use of the AFE 14.

The image processing section 15 performs various types of image processing (color interpolation processing, gradation conversion processing, white balance adjustment and the like) on a digital image signal output from the AFE 14.

The first memory 16 temporarily stores data of image in a pre-process or post-process of image processing. For example, the first memory 16 is formed of an SDRAM being a volatile storage medium. Further, the second memory 17 is a nonvolatile memory that stores a program executed by the CPU 19, a data table presenting a correspondence between an SN ratio in each image signal and a value of imaging sensitivity, and the like.

The recording interface 18 has a connector for connecting a nonvolatile storage medium 22 thereto. Further, the recording interface 18 executes writing/reading of data of main image to be described later to/from the storage medium 22 connected to the connector. The aforementioned storage medium 22 is formed by a hard disk, a memory card including a semiconductor memory, or the like. Note that in FIG. 1, a memory card is illustrated as an example of the storage medium 22.

The CPU 19 is a processor that comprehensively controls an operation of the electronic camera 10. For example, at a time of operation in a photographing mode for photographing a subject, the CPU 19 drives the imaging element 13 in accordance with an input of imaging instruction made by a user, and executes imaging processing of a main image accompanied by a recording of the image in the nonvolatile storage medium 22.

Further, in advance of the imaging of the main image, the CPU 19 in the photographing mode executes a publicly-known automatic exposure calculation, and sets an imaging sensitivity being one parameter of imaging conditions. Further, the CPU 19 may also set the above-described imaging sensitivity based on an input by the user.

The operating section 20 has a plurality of switches for accepting an operation of the user. This operating section 20 is formed of, for example, a release button for accepting an imaging instruction of the main image, a cross-shaped cursor key, a decision button and the like.

Note that the electronic camera 10 includes a so-called best shot mode in which a plurality of images are continuously imaged, the plurality of generated images are once recorded, an image evaluation is then conducted, and an image with low evaluation is deleted. This mode may be set based on an operation of the user via the operating section 20, or may also be automatically set by the CPU 19. Note that in the best shot mode, the user gives a photographing instruction by operating the release button of the operating section 20 one time.

Next, an operation example of the electronic camera 10 in the best shot mode will be described by using a flow chart in FIG. 2.

In step S101, the CPU 19 judges whether or not the photographing instruction is given by the user. The CPU 19 waits until when the photographing instruction is given by the user via the operating section 20, and when the photographing instruction is given, the CPU 19 proceeds to step S102.

In step S102, the CPU 19 controls the respective sections to photograph an n-th image. Note that at an initial step S102, n equals to 1. Note that in the description hereinbelow, an image generated by a photographing at n-th time is referred to as Img[n]. For example, an image generated by a photographing at first time corresponds to Img[1].

In Step S103, the CPU 19 records the n-th image generated through the imaging in step S102 in the storage medium 22 via the recording interface 18. Note that the CPU 19 may also record the image in the first memory 16, instead of recording the image in the storage medium 22.

In step S104, the CPU 19 judges whether or not the processing from step S102 to step S103 with respect to N pieces of images is completed. When the CPU 19 judges that the processing with respect to N pieces of images is not completed, it proceeds to step S105, and when the CPU 19 judges that the processing with respect to N pieces of images is completed, it proceeds to later-described step S106. Note that N indicates a previously determined number of pieces of images to be photographed (N=20, for example). The number of pieces of images may be a fixed number, a number automatically determined by the CPU 19, or a number determined by an operation of the user via the operating section 20.

In step S105, the CPU 19 sets that n=n+1, and returns to step S102. Specifically, the CPU 19 repeats the photographing of N times (step S102), and records N pieces of images (step S103).

In step S106, the CPU 19 calculates an evaluation value E[n] with respect to each of the N pieces of images recorded in the storage medium 22. Note that in the description hereinbelow, an evaluation value calculated with respect to the n-th image is referred to as an evaluation value E[n]. For example, an evaluation value calculated with respect to a first image is an evaluation value E[1]. The calculation of evaluation value is conducted in a similar manner to that of a publicly-known technique, based on brightness information, focus information, contrast information, edge information and the like, for example.

In step S107, the CPU 19 performs an evaluation of image with respect to each of the N pieces of images recorded in the storage medium 22, based on the evaluation value E[n] calculated in step S106. The evaluation of image is conducted in a similar manner to that of a publicly-known technique, by assigning a point to the evaluation value E[n] and the like, for example. In the assignment of points, it is preferable to conduct a comprehensive evaluation based on factors of exposure, contrast, blur, smile, closed eyes and the like, for example.

In step S108, the CPU 19 determines an image to be deleted. The CPU 19 selects, based on the evaluation conducted in step S107, a predetermined number of pieces (15 pieces, for example) of images in ascending order of the evaluation, as images to be deleted. By conducting such a selection, an image with high evaluation can be selectively remained. Note that the number of pieces of images to be deleted may be a fixed number, a number automatically determined by the CPU 19, or a number determined by an operation of the user via the operating section 20. Note that if the determination at the time of determining the images to be deleted is conducted based on a comparison between the evaluation value E[n] and a threshold value, the aforementioned threshold value may be adjusted so that the number of images to be selectively remained (images remained without being deleted) becomes one or more.

In step S109, the CPU 19 deletes the images determined in step S108 from the storage medium 22.

Note that when the images generated through the photographing are recorded in the first memory 16 in step S103, the CPU 19 deletes the images from the first memory, and records the remaining images in the storage medium 22 via the recording interface 18.

In step S110, the CPU 19 performs a scene recognition. The CPU 19 performs the scene recognition in a similar manner to that of a publicly-known technique, based on the images (images remained without being deleted in step S109) recorded in the storage medium 22. For example, the CPU 19 comprehensively analyzes image information of the images, and photographing information (aperture, shutter speed, ISO sensitivity, focal distance, and the like), to thereby recognize what kind of a main subject is.

This scene recognition is performed for estimating whether or not a subject has a trajectory of motion. For example, in a scene of portrait, group photograph or the like, it can be estimated that a subject has no trajectory of motion (the subject is not likely to have a trajectory of motion). Further, for example, in a scene such that a subject is a person doing sports or a vehicle, it can be estimated that the subject has a trajectory of motion (the subject is likely to have a trajectory of motion).

In step S111, the CPU 19 judges "whether or not the subject has the trajectory of motion" based on the result of scene recognition conducted in step S110. When the CPU 19 judges that "the subject has the trajectory of motion", it proceeds to step S112, and when the CPU 19 judges that "the subject has no trajectory of motion", it proceeds to later-described step S113. Basically, when "the subject has the trajectory of motion", reproduction order in chronological order is preferable, and when "the subject has no trajectory of motion", it can be considered that the reproduction order does not have to be the one in chronological order.

Note that when a period of time of photographing is long, and when the number of images (images remained without being deleted in step S109) recorded in the storage medium 22 is small, there is a case where it is not possible to judge "whether or not the subject has the trajectory of motion". In such a case, it is also possible to configure such that the CPU 19 proceeds to a previously determined step (step S113, for example), between step S112 and step S113.

If it is judged that "the subject has the trajectory of motion" in step S111, the CPU 19 determines, in step S112, the reproduction order of the images (images remained without being deleted in step S109) recorded in the storage medium 22 in accordance with the sequence of imaging in the photographing explained in step S102.

A case in which "the subject has the trajectory of motion" indicates a case where a main subject is a person performing a golf swing, a case where the main subject is a moving vehicle and the like. In such a case, there is a high possibility that the main subject continuously moves or the main subject continuously changes, so that the reproduction order is preferably the one in chronological order. Therefore, the CPU 19 determines the reproduction order in accordance with the sequence of imaging in the photographing of the plurality of images. By determining the reproduction order as described above, the user can confirm, at the time of reproduction, the trajectory of motion by visually observing the plurality of images which change in chronological order. Accordingly, the user can perform comparison of the plurality of images with no uncomfortable feeling, and can promptly judge that which image is the most preferable image.

On the other hand, if it is judged that "the subject has no trajectory of motion" in step S111, the CPU 19 determines, in step S113, the reproduction order of the images (images remained without being deleted in step S109) recorded in the storage medium 22 in descending order of the evaluation, based on the result of evaluation explained in step S107.

A case where "the subject has no trajectory of motion" indicates a case where the subject is a person in a group photograph or a ceremonial photograph, a case where the subject is a landscape and the like. In such a case, there is a high possibility that although there is no large motion or change in the main subject itself, a detail of a smile, closed eyes and the like is different, and thus there is no advantage in the reproduction order in chronological order. Therefore, the CPU 19 determines the reproduction order in descending order of the evaluation. By determining the reproduction order as described above, the user can perform comparison by sequentially visually observing the plurality of images in descending order of the evaluation, and can promptly judge that which image is the most preferable image, at the time of reproduction.

Particularly, when a subject is a so-called portrait and the like, "whether or not a background region stands out" also becomes an important factor. Accordingly, it is also possible that "whether or not the background region stands out" is taken into consideration in the evaluation, based on a saliency map or the like. The saliency map is a map presenting a particularity with respect to a surrounding region, based on a color, a brightness, an edge amount, a directionality of edge and the like. By performing the evaluation using such a map, the evaluation of image can be conducted based on the background region. Note that the evaluation regarding "whether or not the background region stands out" may also be conducted at a time same as the time of calculating the evaluation value E[n] explained in step S106 and the time of the evaluation explained in step S107, may also be conducted when it is possible to judge that the evaluation regarding "whether or not the background region stands out" is effective based on the result of scene recognition explained in step S110, or may also be conducted at the time of determining the reproduction order in step S113.

Further, it is also possible that when the reproduction order is determined in descending order of the evaluation in step S113, a method of determining the reproduction order is changed based on the result of scene recognition explained in step S110. For example, it is also possible that the reproduction order is determined in descending order of overall evaluation in a group photograph, and the reproduction order is determined in descending order of the evaluation regarding "whether or not the background region stands out" in a portrait.

In step S114, the CPU 19 determines names of the respective images (images remained without being deleted in step S109) recorded in the storage medium 22, in accordance with the reproduction order determined in step S112 or step S113. Normally, at a time of generating images, a reproduction is conducted in ascending order of numeric characters, alphabet or the like. Accordingly, the CPU 19 determines the names of the respective images in accordance with the above-described reproduction order.

In step S115, the CPU 19 records the names of the respective images determined in step S114, and terminates the series of processing. The CPU 19 changes names of the respective images (images remained without being deleted in step S109) recorded in the storage medium 22 to the names determined in step S114.

Note that when the plurality of images (plurality of images remained without being deleted in step S109) obtained through the series of processing are grouped to be recorded, an image whose reproduction order is the first may also be set as a representative image (main image).

As described above, according to the present embodiment, the imaging of subject is conducted to generate the plurality of images, and the evaluation is performed on the generated plurality of images. Further, based on the evaluation result, a part of images out of the plurality of images generated by the imaging section is selected, and the scene recognition is performed on the selected plurality of images. Further, based on the recognition result, the reproduction order of the plurality of images after being subjected to the scene recognition is determined. Therefore, the reproduction order of the plurality of images can be set to an optimum reproduction order in accordance with the characteristic of the subject.

Particularly, according to the present embodiment, by estimating whether or not there is a continuous change in the main subject based on the result of scene recognition, and determining the reproduction order in accordance with whether or not there is a continuous change in the main subject, it is possible to determine the optimum reproduction order in accordance with the characteristic of the subject. Further, by determining the reproduction order as described above, when a plurality of pieces of images recorded in the same scene are reproduced, it is possible to constantly perform the reproduction in order in accordance with a sense of human being, so that the user can enjoy viewing images with no uncomfortable feeling, and can promptly judge that which image is the most preferable image.

Note that although the present embodiment illustrates the example in which the N pieces of images are photographed (step S102) and recorded (step S103), and then the calculation of evaluation value E[n] (step S106) is conducted, the present invention is not limited to this example. For example, it is also possible that the N pieces of images are photographed (step S102), and right after that, the calculation of evaluation value E[n] (step S106) is started.

Further, in the present embodiment, explanation is made by citing the evaluation and the sequence of imaging, as examples, as the factors of determining the reproduction order, but, the present invention is not limited to the examples. For example, it is also possible that, if the electronic camera 10 has a function of authenticating and photographing a previously registered specific person, the reproduction order is determined in accordance with a registration sequence for personal authentication. The above-described function is utilized in a goal scene of a footrace of an athletic festival and the like, for instance. For example, it is also possible to accelerate reproduction order of image in which an evaluation of a part of a person with high registration sequence for personal authentication (with high priority) is higher, or the person is photographed in a larger size, and to delay the reproduction order of image in which the evaluation of the part of the person is lower, or the person is photographed in a smaller size. Note that it is also possible that the determination of the reproduction order as above is constantly carried out when the above-described function is effective, or it is also possible to judge whether or not the determination is carried out by taking the result of scene recognition explained in step S110 into consideration.

Further, the present embodiment illustrates the example in which the regularity for determining the reproduction order is changed in accordance with the result of scene recognition explained in step S110, but, the present invention is not limited to this example. For example, it is also possible to configure such that when a photographing mode such as a portrait and a landscape mode is set, the regularity for determining the reproduction order is changed in accordance with the photographing mode. Further, it is also possible that the user previously sets a relation between a predetermined condition and the regularity for determining the reproduction order, and when the condition is satisfied, the regularity for determining the reproduction order is changed based on the above-described relation.

Further, the present embodiment illustrates the example in which the names of the respective images are determined in accordance with the reproduction order, but, the present invention is not limited to this example. For example, it is also possible to configure such that the names of the respective images are not changed, and information indicating the reproduction order is recorded by being corresponded to the respective images. For example, it is also possible to record, in collateral information (tag information) of image and the like, information indicating the reproduction order, information indicating the regularity for determining the reproduction order and the like.

Figure 2:
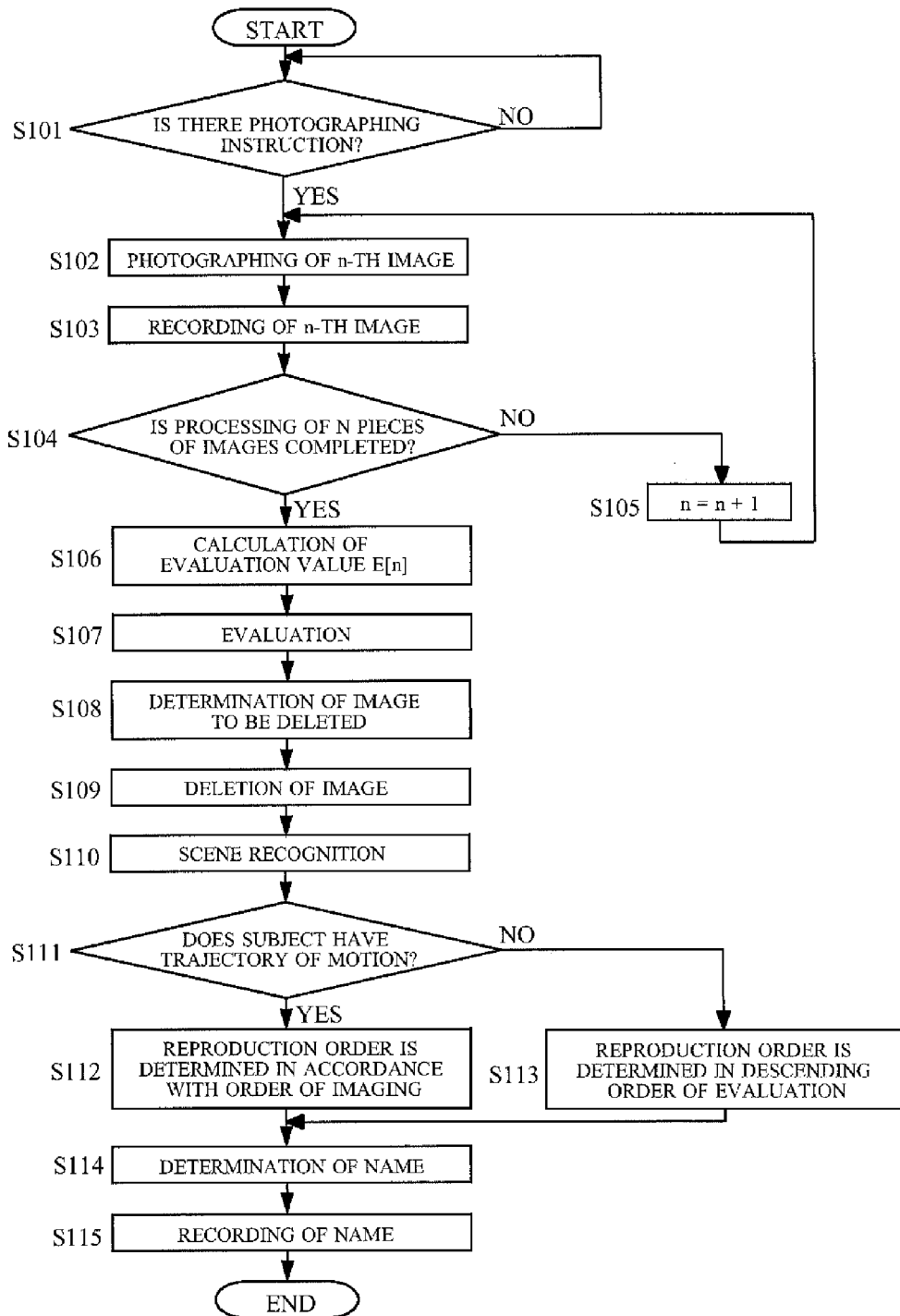
FIG. 2 is a flow chart illustrating an operation of the electronic camera according to the one embodiment.

Further, the present embodiment illustrates the example of performing the series of processing illustrated in the flow chart in FIG. 2 during the best shot mode, but, the present invention is not limited to this example. For example, also in a case of generating a plurality of images in a continuous photographing mode, the present invention can be applied in a similar manner. Further, it is also possible to perform the processing in and after step S106 by setting a plurality of images selected by the user as targets.

Further, the above-described embodiment explains the example of realizing the technique of the present invention with the use of the electronic camera 10 illustrated in FIG. 1. However, the present invention is not limited to this. For example, it is also possible to similarly apply the present invention to an electronic camera having a configuration other than that of the electronic camera 10 illustrated in FIG. 1.

Further, the image processing device described in the above-described embodiment may be realized by way of software with the use of a computer and an image processing program. In this case, a part or all of the processing in and after step S106 described in the flow chart in FIG. 2 may be configured to be realized by a computer.

Further, it is also possible to similarly apply the present invention to electronic devices (for example, a photo viewer, a digital photo frame, a printer of photographs, and the like) and the like having a reproduction display function or a retouch function of digital images, other than the above-described computer. Further, the electronic camera 10 explained in the above-described embodiment may also be mounted as a camera module such as a mobile phone terminal.

Further, the above-described embodiment explains the example in which the respective processings are realized by way of software, but, it goes without saying that these respective processings are realized by way of hardware with the use of an ASIC or the like.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled on the art, it is not desired to limit the inventive embodiment to exact construction and operation illustrated and described, and accordingly all suitable modifications and equivalents may be resorted to, falling within the scope thereof.

The invention claimed is:

1. An electronic camera, comprising:
   an imaging section imaging a subject and generating a plurality of images;
   an evaluating section performing evaluation on the plurality of images generated by the imaging section;
   a selecting section selecting, based on an evaluation result of the evaluating section, a part of images from among the plurality of images generated by the imaging section;
   a recognizing section performing scene recognition on a plurality of images selected by the selecting section;
   a determining section determining, based on a recognition result of the recognizing section, reproduction order of the plurality of images subjected to the scene recognition, and
   a naming section determining a name for each of the plurality of images subjected to the scene recognition in accordance with the reproduction order determined by the determining section.

2. The electronic camera according to claim 1, further comprising:
   a recording section recording the plurality of images generated by the imaging section in a recording medium; and
   a deleting section deleting a part of images selected by the selecting section from among the plurality of images recorded in the recording medium based on the evaluation result of the evaluating section, wherein
   the recognizing section performs the scene recognition on a plurality of images remained without being deleted by the deleting section.

3. The electronic camera according to claim 2, wherein the recording section records information indicating the reproduction order determined by the determining section by associating the information with the plurality of images remained without being deleted by the deleting section.

4. An electronic camera, comprising:
   an imaging section imaging a subject and generating a plurality of images;
   an evaluating section performing evaluation on the plurality of images generated by the imaging section;
   a selecting section selecting, based on an evaluation result of the evaluating section, a part of images from among the plurality of images generated by the imaging section;
   a recognizing section performing scene recognition on a plurality of images selected by the selecting section; and
   a determining section determining, based on a recognition result of the recognizing section, reproduction order of the plurality of images subjected to the scene recognition,
   wherein the determining section determines, based on the recognition result of the recognizing section, the reproduction order to be descending order of the evaluation performed by the evaluating section or order of imaging performed by the imaging section, and
   wherein the determining section determines, as the recognition result of the recognizing section, the reproduction order to be the order of imaging performed by the imaging section in a case where there is a continuous change in a main subject and determines the reproduction order to be the descending order of the evaluation performed by the evaluating section in a case where there is no continuous change in the main subject.

5. The electronic camera according to claim 4, wherein:
the evaluating section further evaluates whether or not a background region stands out when the recognition result of the recognizing section is a scene of portrait; and
the determining section determines the reproduction order to be ascending order of standing-out degree of the background region as the evaluation result of the evaluating section when the recognition result of the recognizing section is the scene of portrait.

6. A non-transitory storage medium storing an image processing program causing a computer to realize image processing on images to be processed, the image processing program comprising:
obtaining a plurality of images as the images to be processed;
performing evaluation on the plurality of images obtained in the obtaining step;
performing scene recognition on the plurality of images obtained in the obtaining step;
determining, based on a recognition result in the performing scene recognizing step, reproduction order of the plurality of images subjected to the scene recognition; and
determining a name for each of the plurality of images subjected to the scene recognition in accordance with the reproduction order determined by the determining step.

7. An electronic camera, comprising:
an imaging section imaging a subject and generating a plurality of images;
an evaluating section performing evaluation on the plurality of images;
a selecting section selecting, based on an evaluation result of the evaluating section, a part of images from among the plurality of images; and
an output section outputting the images being selected to be order of imaging in a case where a subject has motion.

8. An image processing device, comprising:
an obtaining section obtaining a plurality of images;
an evaluating section performing evaluation on the plurality of images;
a selecting section selecting, based on an evaluation result of the evaluating section, a part of images from among the plurality of images; and
an output section outputting the images being selected to be order of imaging in a case where a subject has motion.

* * * * *